(12) United States Patent
Krammer

(10) Patent No.: US 6,419,064 B1
(45) Date of Patent: Jul. 16, 2002

(54) FLUID FRICTION COUPLING

(75) Inventor: Raimund Krammer, Gerolzhofen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/645,675

(22) Filed: Aug. 24, 2000

(30) Foreign Application Priority Data

Aug. 24, 1999 (DE) .......................................... 199 40 099

(51) Int. Cl.[7] .............................................. F16D 35/02
(52) U.S. Cl. .................................................. 192/58.61
(58) Field of Search .......................... 192/58.61, 58.8, 192/82 T

(56) References Cited

U.S. PATENT DOCUMENTS

| | | | | | |
|---|---|---|---|---|---|
| 4,271,945 A | * | 6/1981 | Budinski | ................. | 192/58.61 |
| 4,305,491 A | * | 12/1981 | Rohrer | ................... | 192/58.61 |
| 4,633,944 A | * | 1/1987 | Light | ...................... | 192/58.61 |
| 4,893,703 A | * | 1/1990 | Kennedy et al. | ......... | 192/58.61 |
| 5,555,963 A | * | 9/1996 | Martin | .................... | 192/58.61 |
| 6,026,943 A | * | 2/2000 | Fuchs et al. | ............. | 192/58.61 |

FOREIGN PATENT DOCUMENTS

| | | | | |
|---|---|---|---|---|
| DE | 196 45 478 A1 | 5/1998 | ........... | F16D/35/00 |
| DE | 44 13 997 C2 | 1/1999 | ........... | F16D/35/02 |
| DE | 197 26 423 A1 | * | 2/1999 | |

* cited by examiner

Primary Examiner—Richard M. Lorence
(74) Attorney, Agent, or Firm—Cohen, Potani, Lieberman & Pavane

(57) ABSTRACT

A fluid friction coupling for driving a fan of an internal combustion engine includes a solenoid configured such that it surrounds a drive shaft and is operatively arranged for moving a control part. The control part moves a valve body which controls the flow of a viscous fluid into a working chamber. The fluid friction coupling is of particularly compact configuration and magnetic losses are kept particularly low.

35 Claims, 2 Drawing Sheets

FLUID FRICTION COUPLING

BACKGROUND OF THE INVENTION

1. Field of the Invention

The invention relates to a fluid friction coupling for transmitting a torque from a drive shaft to a further component, more specifically a fan of an internal combustion engine of a motor vehicle, via a viscous fluid level in a working chamber in the further component, the fluid friction coupling including a supply chamber for viscous fluid with a partition having a connection opening arranged between the working chamber and the supply chamber and a valve body operatively arranged for releasing or closing the connection opening via a solenoid.

2. Description of the Related Art

A fluid friction coupling is disclosed in DE 196 45 478 A1 for transmitting torque via a viscous fluid level in a working chamber with a valve body arranged between the working chamber and a supply chamber. The valve body is operable via a solenoid for opening or closing a connection opening between the supply chamber and working chamber. In this fluid friction coupling, the valve body is mounted pivotably and bears a permanent magnet. The solenoid surrounds an input drive shaft which comprises a magnetically conducting material, and magnetic forces are conducted via the drive shaft into a housing which has the working chamber and the partition. When suitably subjected to current, the solenoid attracts the permanent magnet or repels it and thereby controls the position of the valve body. A disadvantage of this fluid friction coupling is that the solenoid is at a very great distance from the permanent magnet and therefore high magnetic losses occur. For example, in the case of high temperatures which predominate frequently at the fan of the internal combustion engine in the motor vehicle, these magnetic losses impair the controlling means of the valve body.

German reference DE 44 13 997 C2 discloses another fluid friction coupling in which a valve body is connected to a displaceable piston arranged in a housing having a working chamber and a partion arranged opposite the drive shaft. A controlling means with a stepping motor is operatively arranged for displacing the piston and has a hydraulic line which is arranged on that side of the housing which lies opposite the drive shaft. However, because of the arrangement of the controlling means on that side of the housing which is remote from the drive shaft, the fluid friction coupling requires very large dimensions.

SUMMARY OF THE INVENTION

It is an object of the present invention to provide a fluid friction coupling for transmitting a torque from a drive shaft to a further component, more specifically a fan of an internal combustion engine of a motor vehicle, via a viscous fluid level in a working chamber such that the construction is as simple and compact as possible and in which the magnetic losses are minimized.

According to the invention, this problem is met by a valve body being connected to a control element, and by the solenoid being configured for moving the control element.

In this configuration, the distance between the solenoid and the valve body is spanned via the control element. Furthermore, the magnetic field lines do not need to be conducted via the drive shaft. This minimizes magnetic losses during control of the valve body. The solenoid may be arranged in a space-saving manner close to that side of the housing which faces the drive shaft. Furthermore, since the magnetic losses of the solenoid are particularly low, the solenoid may be made with very small dimensions.

The fluid friction coupling according to the present invention is of particularly simple structural configuration when the control element has an anchor plate arranged in front of the solenoid and a control part which is connected to the anchor plate penetrates a wall of a housing in which the partition is arranged. The anchor plate may be arranged at a small distance from the solenoid and may be configured to correspond to its shape, so that magnetic losses are kept particularly low.

According to another embodiment of the present invention, the valve body comprises a particularly cost-effective configuration and may be fitted in a simple manner when it is designed as a leaf-spring.

A further reduction in the dimensions of the fluid friction coupling according to the present invention may be achieved if actuating means of the valve body are exclusively arranged in a radially outer region relative to the drive shaft. This also results in a simple structural configuration for the fluid friction coupling according to the present invention.

According to another embodiment of the present invention, the anchor plate and the valve body may be guided together axially if the control part is mounted pivotably on the anchor plate and/or on the valve body.

According to another embodiment of the present invention, the control part may be mounted via a particularly simple structural configuration if at least one of the anchor plate and the valve body has ball sockets for receiving the ends of the control part which are of spherical configuration corresponding to the ball sockets. If both side of the control part are mounted in ball sockets, the anchor plate may be mounted cardanically.

According to another embodiment of the present invention, the mounting of the control part may be further simplified if the control part penetrates the anchor plate and the valve body and if the ball sockets are arranged on mutually remote sides of the anchor plate and the valve body.

The anchor plate may, for example, be attracted and repelled by the solenoid in response to current supplied to the solenoid. If the current supply or electronic controlling means of the fluid friction coupling according to the present invention fails, a torque may be reliably transmitted if the anchor plate is prestressed by a spring element into a position in which the connection opening in the partition is released. When the fluid friction coupling is provided for the fan of a motor vehicle, the internal combustion engine is reliably cooled during a failure of the controlling means.

According to another embodiment of the present invention, the tolerances between the valve body and the anchor plate may be compensated for in a simple and particularly accurate manner after the solenoid is fitted by adjusting the length of the control part. For this purpose, the control part may be of a tappet design with length-adjustable configuration.

According to another embodiment of the present invention, a gap which is generated between the anchor plate and the solenoid when the anchor plate is moved axially may be kept particularly small if the solenoid has an edge which is arranged to fit around the radial outside of the anchor plate for conducting the magnetic field lines. This arrangement further reduces the magnetic losses of the solenoid.

According to yet another embodiment of the present invention, the solenoid is preferably fastened to a fixed component. Grinding of the rotating anchor plate against the solenoid may be avoided by arranging a contact disk connected in a rotationally fixed manner to the housing for conducting field lines of the solenoid between the anchor plate and a radially inner edge of the solenoid. The contact disk therefore conducts the magnetic field strength to the anchor plate and forms an axial stop for the anchor plate. An air gap between the fixed solenoid and the rotating anchor plate may thereby be restricted to a particularly small size.

According to a further embodiment of the present invention, a sealing element of the control part may be arranged with an edge surrounding the control part. The sealing element may be made to exhibit a particularly low damping of the movement of the control part if the sealing element arranged in the housing also comprises a casing which is manufactured from an elastic material and is spaced apart from the control part. By this means, the control part is held such that it can move in all directions.

A damping displacement restrictor may be arranged on the anchor plate to reduce wear and noise. The manufacturing costs of the fluid friction coupling according to the present invention may be further reduced if the sealing element has an axial stop for the anchor plate. Since the sealing element is in any case generally manufactured from a resilient material, the fluid friction coupling according to the invention does not require the fitting of an additional stop.

The energy consumption of the solenoid may be reduced if the solenoid is arranged in a cool region outside the housing. Since the forces of the solenoid are transmitted to the valve body via a movement of the control part, an increase in the distance between the solenoid and the valve body does not lead to an increase in the energy consumption of the solenoid. The solenoid may also be arranged in a simple manner on a fixed component. The use of sliding contacts which are prone to interference is thereby avoided.

According to another embodiment of the present invention, high energy consumption by the solenoid for long travel distances movements of the control element may be avoided in a simple manner if the spring element is arranged at a distance from the control element and by arranging the anchor plate closer to the solenoid in the region of the spring element than in the region of the control element in the currentless or deenergized state of the solenoid. In this configuration, the anchor plate is mounted cardanically. When the solenoid is in a currentless state, the anchor plate is situated opposite the solenoid in a tilted position. When current is supplied to the solenoid, the anchor plate tips into the parallel position to the solenoid.

According to yet a further embodiment of the present invention, radial play of the anchor plate may be avoided in a simple manner if the spring element is fastened nondisplaceably in each case to the housing and to the anchor plate and extends from a radially inner region toward a radially outer region. By means of this configuration, the anchor plate is guided particularly accurately and may therefore be arranged at a particularly small distance from the poles of the solenoid.

The fluid friction coupling according to the present invention is configured particularly compactly and requires particularly little current consumption if the anchor plate surrounds the drive shaft concentrically, and if the control element and the spring element are arranged eccentrically with respect to the drive shaft.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
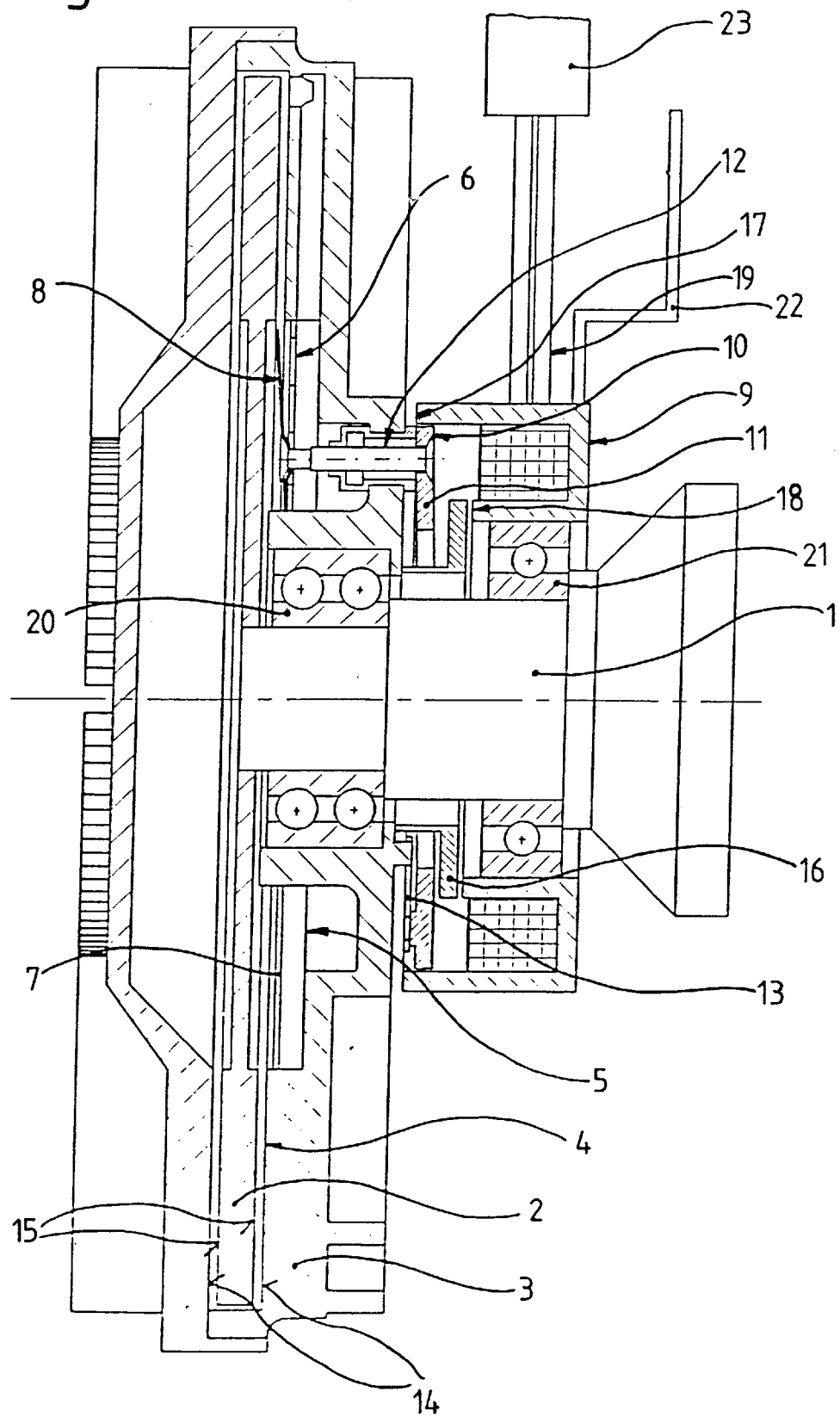
FIG. 1 is a longitudinal sectional view of a fluid friction coupling according to an embodiment of the present invention.

A fluid friction coupling according to an embodiment of the present invention is shown in FIG. 1 for a fan drive of a motor vehicle. The fluid friction coupling includes a housing 3 and a drive disk 2 driven by a drive shaft 1. The drive shaft 1 may, for example, comprise a crankshaft or a camshaft of an internal combustion engine. Fan blades may be fastened to the housing 3 for conveying cooling air when the housing is rotated via transmission of torque between the drive disk 2 and the housing 3.

The drive disk 2 is arranged in the housing 3 which also includes a working chamber 4 and a supply chamber 5 for viscous fluid. The working chamber 4 and the supply chamber 5 are separated from each other by a partition 7 having a connection opening 6 arranged therethrough. A single connection opening 6 is illustrated in the drawing. Of course, the partition 7 may also have a plurality of connection openings 6. When the connection opening 6 is released, viscous fluid passes from the supply chamber 5 into the working chamber 4 which is of very narrow configuration. The sides of the drive disk 2 and the housing 3 which face the working chamber 4 each have shearing surfaces 14, 15 arranged such that when the working chamber 4 is filled with viscous fluid, a torque is transmitted by the shearing surface 15 of the drive disk 2 to the shearing surface 14 of the housing 3. A valve body 8 is arranged in the housing for selectively blocking the connection opening 6 for preventing the passing of viscous fluid from the supply chamber 5 to the working chamber 4 and thereby stopping the torque transmission. The valve body 8 is connected to a control element 10 which may be moved by a fixed solenoid 9. The control element 10 comprises an anchor plate 11 arranged proximate the solenoid 9 and a control part 12 connecting the anchor plate 11 to the valve body 8. A strip-shaped spring element 13 holds the anchor plate 11 at a position relative to the housing 3. The valve body 8 comprises a leaf-spring having an end remote from the connection opening that is fastened to the partition 7 and is prestressed toward the drive disk 2—i.e., to the left in FIG. 1. The control part 12 is therefore under tensile stress.

A contact disk 16 which forms a stop for the axial movement of the anchor plate 11 is arranged in a rotationally fixed position on the housing 3. The solenoid 9 has a radially outer edge 17 that fits radially around the anchor plate 11 and a radially inner edge 18 arranged directly in front of the contact disk 16. The contact disk 16 has a particularly low magnetic resistance and conducts magnetic field lines from the solenoid 9 to the anchor plate 11. Each of the housing 3 and the solenoid 9 are arranged on respective mountings 20, 21 on the drive shaft 1 such that the drive shaft 1 is rotatable relative to each. The solenoid 9 is supported on a fixed component via a support 22 and has a connection 19 to an electronic controlling means 23. The solenoid 9 may be activated positively or negatively by the controlling means 23 via, for example, a square wave or pulse width modulated signal.

Figure 2:
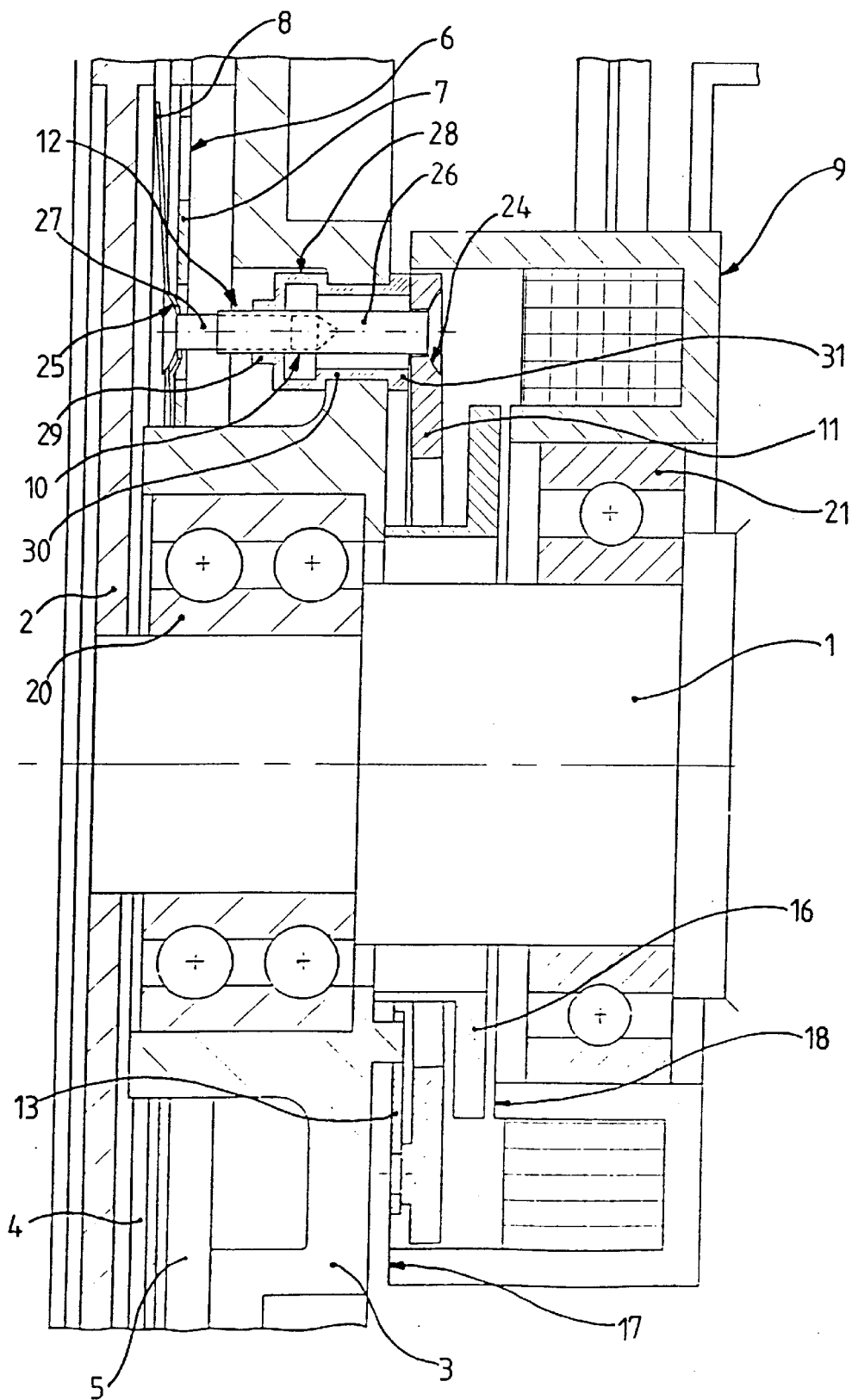
FIG. 2 is a more detailed longitidinal sectional view of a solenoid of the fluid friction coupling in FIG. 1.

FIG. 2 shows a more detailed view of the solenoid 9 with adjacent regions of the fluid friction coupling. The valve body 8 and the anchor plate 11 have respective ball sockets 24, 25 arranged on mutually remote sides for holding spherically configured ends of the control part 12. The control part 12 comprises a threaded sleeve 26 and a threaded bolt 27 configured so that the length of the control part 12 is adjustable to compensate for manufacturing tolerances. As an alternative, the control part 12 may also comprise sleeves or other parts which are slidably pressed onto one another to adjust the length of the control part 12. Furthermore, FIG. 2 also shows a sealing element 28 for sealing the control part 12 in the housing 3 with an edge 29 which radially surrounds the control part 12 and a casing 30 which is spaced apart from the control part 12. The sealing element 28 further comprises a stop 31 for the anchor plate 11 arranged outside the housing 3. The anchor plate 11 surrounds the drive shaft 1 and is prestressed by the spring element 13 and the leaf-spring-like valve body 8 into the position shown in which the connection opening 6 is released. Therefore, when no current is supplied to the solenoid 9, viscous fluid flows from the supply chamber 5 into the working chamber 4 and the fluid friction coupling then transmits a torque. In this deenergized state of operation, the anchor plate 11 is situated in a position tilted with respect to the contact disk 16. That region of the anchor plate 11 which is held by the spring element 13 is arranged closer to the contact disk 16 than that region of the anchor plate 11 connected to the control element 10. When current is supplied to the solenoid 9, the region of the anchor plate 11 which is held by the spring element 13 moves against the contact disk 16. In this energized state, the anchor plate 11 is tilted into a parallel position with respect to the contact disk 16. To avoid radial play, the anchor plate 11 is fixedly connected to one end of the spring element 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A fluid friction coupling for transmitting a torque to a drive fan, comprising:
    an input shaft;
    a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;
    a valve body movably arranged in said component for selectively releasing and closing said connection opening;
    a control element connected to said valve body; and
    a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing, and wherein said control part is pivotably mounted on one of said anchor plate and said valve body.

2. The fluid friction coupling of claim 1, wherein said valve body comprises a leaf-spring.

3. The fluid friction coupling of claim 1, wherein said solenoid and said control element comprise actuating means for said valve body and said actuating means are arranged in a region radially outside of said drive shaft.

4. The fluid friction coupling of claim 1, wherein said solenoid comprises an edge arranged for fitting around a radial outside of said anchor plate for conducting magnetic field lines.

5. The fluid friction coupling of claim 1, wherein said solenoid is arranged outside of said component.

6. A fluid friction coupling for transmitting a torque to a drive fan, comprising:
    an input shaft;
    a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;
    a valve body movably arranged in said component for selectively releasing and closing said connection opening;
    a control element connected to said valve body; and
    a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing, and wherein said anchor plate and said valve body have ball sockets and said control part comprises ends with spherical configurations received in said ball sockets.

7. The fluid friction coupling of claim 6, wherein said control part penetrates said anchor plate and said valve body and wherein said ball sockets are arranged on mutually remote sides of said anchor plate and said valve body.

8. The fluid friction coupling of claim 6, wherein said valve body comprises a leaf-spring.

9. The fluid friction coupling of claim 6, wherein said solenoid and said control element comprise actuating means for said valve body and said actuating means are arranged in a region radially outside of said drive shaft.

10. The fluid friction coupling of claim 6, wherein said solenoid comprises an edge arranged for fitting around a radial outside of said anchor plate for conducting magnetic field lines.

11. The fluid friction coupling of claim 6, wherein said solenoid is arranged outside of said component.

12. A fluid friction coupling for transmitting a torque to a drive fan, comprising:
   an input shaft;
   a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;
   a valve body movably arranged in said component for selectively releasing and closing said connection opening;
   a control element connected to said valve body;
   a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing; and
   a spring element operatively connected in said housing for prestressing said anchor plate into a position in which said connection opening in said partition is released.

13. The fluid friction coupling of claim 12, wherein said spring element is separated from said control element by a distance and wherein a portion of said anchor plate connected to said spring element is arranged closer to said solenoid than the portion of said anchor plate connected to said control part in a currentless state of said solenoid.

14. The fluid friction coupling of claim 12, wherein said spring element is fixedly connected to said housing and to said anchor plate and extends from a radially inner region toward a radially outer region.

15. The fluid friction coupling of claim 12, wherein said anchor plate concentrically surrounds said drive shaft and wherein said control element and said spring element are arranged eccentrically with respect to said drive shaft.

16. The fluid friction coupling of claim 12, wherein said valve body comprises a leaf-spring.

17. The fluid friction coupling of claim 12, wherein said solenoid and said control element comprise actuating means for said valve body and said actuating means are arranged in a region radially outside of said drive shaft.

18. The fluid friction coupling of claim 12, wherein said solenoid comprises an edge arranged for fitting around a radial outside of said anchor plate for conducting magnetic field lines.

19. The fluid friction coupling of claim 12, wherein said solenoid is arranged outside of said component.

20. A fluid friction coupling for transmitting a torque to a drive fan, comprising:
   an input shaft;
   a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;
   a valve body movably arranged in said component for selectively releasing and closing said connection opening;
   a control element connected to said valve body; and
   a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing, and wherein said control part comprises a tappet comprising an adjustable length.

21. The fluid friction coupling of claim 20, wherein said valve body comprises a leaf-spring.

22. The fluid friction coupling of claim 20, wherein said solenoid and said control element comprise actuating means for said valve body and said actuating means are arranged in a region radially outside of said drive shaft.

23. The fluid friction coupling of claim 20, wherein said solenoid comprises an edge arranged for fitting around a radial outside of said anchor plate for conducting magnetic field lines.

24. The fluid friction coupling of claim 20, wherein said solenoid is arranged outside of said component.

25. A fluid friction coupling for transmitting a torque to a drive fan, comprising:
   an input shaft;
   a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;
   a valve body movably arranged in said component for selectively releasing and closing said connection opening;
   a control element connected to said valve body;
   a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing; and
   a contact disk connected in a rotationally fixed manner to said housing for conducting magnetic field lines generated by the solenoid, wherein said contact disk is arranged between said anchor plate and a radially inner edge of said solenoid.

26. The fluid friction coupling of claim 25, wherein said valve body comprises a leaf-spring.

27. The fluid friction coupling of claim 25, wherein said solenoid and said control element comprise actuating means for said valve body and said actuating means are arranged in a region radially outside of said drive shaft.

28. The fluid friction coupling of claim 25, wherein said solenoid comprises an edge arranged for fitting around a radial outside of said anchor plate for conducting magnetic field lines.

29. The fluid friction coupling of claim 25, wherein said solenoid is arranged outside of said component.

30. A fluid friction coupling for transmitting a torque to a drive fan, comprising:

an input shaft;

a component defining a working chamber and a supply chamber for viscous fluid, said component further comprising a partition arranged between said working chamber and said supply chamber and having a connection opening, wherein torque is transmitted from said input shaft to said component as a function of viscous fluid level in said working chamber;

a valve body movably arranged in said component for selectively releasing and closing said connection opening;

a control element connected to said valve body; and a solenoid operatively connected for moving said control element such that said valve body is movable via said solenoid, wherein said control element comprises an anchor plate arranged proximate said solenoid and a control part connected between said anchor plate and said valve body, said component comprising a housing with a wall between said solenoid and said valve body, and said control part penetrating said wall of said housing, and a sealing element arranged in said housing, said sealing element having an edge surrounding said control part and a casing comprising an elastic material and spaced apart from said control part, said sealing element creating a seal between said control part and said housing and allowing movement of the control part in all directions relative to said housing.

31. The fluid friction coupling of claim 30, wherein said sealing element further comprises an axial stop for said anchor plate.

32. The fluid friction coupling of claim 30, wherein said valve body comprises a leaf-spring.

33. The fluid friction coupling of claim 30, wherein said solenoid and said control element comprise actuating means for said valve body and said actuating means are arranged in a region radially outside of said drive shaft.

34. The fluid friction coupling of claim 30, wherein said solenoid comprises an edge arranged for fitting around a radial outside of said anchor plate for conducting magnetic field lines.

35. The fluid friction coupling of claim 30, wherein said solenoid is arranged outside of said component.

* * * * *